United States Patent
Haygood et al.

(10) Patent No.: US 7,200,916 B2
(45) Date of Patent: *Apr. 10, 2007

(54) METHODS OF MAKING UPHOLSTERY FABRIC TACK STRIPS

(76) Inventors: David L. Haygood, 1260 County Road 175, Florence, AL (US) 35634; Gary T. Schwertner, 300 Rock Crusher Rd., St. Joseph, TN (US) 38481

( * ) Notice: Subject to any disclaimer, the term of this patent is extended or adjusted under 35 U.S.C. 154(b) by 374 days.

This patent is subject to a terminal disclaimer.

(21) Appl. No.: 10/808,506

(22) Filed: Mar. 25, 2004

(65) Prior Publication Data

US 2004/0177490 A1    Sep. 16, 2004

Related U.S. Application Data

(60) Division of application No. 10/428,834, filed on May 5, 2003, now Pat. No. 6,989,186, which is a continuation-in-part of application No. 10/180,102, filed on Jun. 27, 2002, now Pat. No. 6,647,610.

(51) Int. Cl.
*B21B 1/46* (2006.01)

(52) U.S. Cl. .................... 29/527.2; 29/469.5; 411/466; 428/132; 264/139

(58) Field of Classification Search ............... 29/527.2, 29/469.5, 91, 91.1; 264/139, 171.14, 171.21, 264/279, 279.1; 411/466; 428/132, 133; 470/158

See application file for complete search history.

(56) References Cited

U.S. PATENT DOCUMENTS

| | | | | |
|---|---|---|---|---|
| 3,670,071 A | * | 6/1972 | Walchle et al. | 264/273 |
| 4,490,074 A | * | 12/1984 | Chaiko | 405/259.1 |
| 4,853,067 A | * | 8/1989 | Annas et al. | 156/351 |
| H788 H | * | 6/1990 | Schneider, Jr. | 216/35 |
| 5,613,817 A | * | 3/1997 | Bush et al. | 411/466 |
| 6,857,178 B2 | * | 2/2005 | Haygood et al. | 29/527.2 |

* cited by examiner

*Primary Examiner*—David P. Bryant
*Assistant Examiner*—Sarang Afzali
(74) *Attorney, Agent, or Firm*—Nixon & Vanderhye, P.C.

(57) ABSTRACT

An upholstery tack strip includes a metal ribbon and a thermoplastic sleeve covering at least a portion of the ribbon. The sleeve includes at least one, and possibly a pair of, lengthwise removed strip section(s) so as to expose a corresponding lengthwise surface of the metal ribbon. The metal ribbon integrally includes nail sections which protrude outwardly from said tack strip. At least one, and preferably both, lateral edges of the metal ribbon are knurled or serrated so as to assist in anchoring the ribbon to the sleeve.

18 Claims, 3 Drawing Sheets

METHODS OF MAKING UPHOLSTERY FABRIC TACK STRIPS

CROSS-REFERENCE TO RELATED APPLICATION

This is a divisional of application Ser. No. 10/428,834, filed May 5, 2003 now U.S. Pat. No. 6,989,186, now pending, which in turn was a continuation-in-part of application Ser. No. 10/180,102, filed Jun. 27, 2002, now U.S. Pat. No. 6,647,610 issued Nov. 18, 2003, the entire content of which is incorporated by reference in this application.

FIELD OF THE INVENTION

The present invention relates generally to the field of upholstery fabric tack strips and methods of making the same, especially tack strips that are used to attach upholstery fabric to an underlying furniture frame member.

BACKGROUND AND SUMMARY OF THE INVENTION

Conventional upholstery tack strips are made from flat metal (e.g., metal) ribbons by a punch-press operation. Specifically, generally triangularly-shaped nails are formed by punching out correspondingly shaped, partially cut-out sections from the metal ribbon at spaced-apart locations along the ribbon's length and then bending the sections so each is at substantially a right angle relative to the ribbon stock. Thus, the nails remain unitarily attached to the metal ribbon, but project outwardly therefrom.

In use, the metal from which conventional tack strips are made can physically mar and/or abrade the upholstery fabric. For example, the ribbon, if formed from metal, may rust over time which might in turn visibly discolor the fabric. Furthermore, the edges of the metal tack strip may abrade or cut the upholstery fabric. In order to prevent such problems, it has been conventional practice to provide upholstery tack strips with a separate C-shaped plastic sleeve which slides over the tack strip along its length. The plastic sleeve, however, is itself problematic in that it involves a separate manufacturing step to slideably mate it with the tack strip. Furthermore, unless some means are provided to restrict relative lengthwise movement between the metal tack strip and the sleeve, the latter can become separated from the former during use and/or installation.

In our recently issued U.S. Pat. No. 6,537,646 B2 (the entire content of which is expressly incorporated hereinto by reference), novel upholstery tack strips are provided which include a thermoplastic sleeve and a metal ribbon embedded within the sleeve. The sleeve itself includes a plurality of removed material sections forming opposed pairs of sleeve windows, while the metal ribbon integrally includes nail sections which protrude outwardly from the tack strip through respective ones of the sleeve windows. Most preferably, the sleeve is extrusion-coated onto the metal ribbon stock using a cross-head die with a screw extruder. The thus-coated metal strip preform may then be transferred to downstream fabrication operations whereby the sleeve windows and nail portions are formed. Since the nail portions protrude outwardly from the tack strip through the sleeve windows, relative lengthwise slippage between the metal ribbon stock and the sleeve is prevented.

The present invention is directed specifically toward improvements to the upholstery tack strips of the type generally disclosed in our above-cited U.S. Pat. No. 6,537,646 B2. More specifically, according to the present invention upholstery tack strips include a metal ribbon and a thermoplastic sleeve covering at least a portion of the ribbon. The sleeve includes at least one lengthwise removed strip section so as to expose a corresponding lengthwise surface of the metal ribbon. Most preferably, at least one (and advantageously both) edges of the metal ribbon are knurled or serrated so as to present a roughened surface to the sleeve and thereby anchor the metal ribbon to the sleeve and thereby assist in maintaining the relative positioning of the sleeve and metal ribbon. An adhesive may optionally alternatively or additionally be applied to the metal ribbon so as to also assist in anchoring the thermoplastic sleeve thereto. The metal ribbon integrally includes nail sections which protrude outwardly from said tack strip.

These and other aspects and advantages will become more apparent after careful consideration is given to the following detailed description of the preferred exemplary embodiments thereof.

BRIEF DESCRIPTION OF THE ACCOMPANYING DRAWINGS

Reference will hereinafter be made to the accompanying drawings, wherein like reference numerals throughout the various FIGURES denote like structural elements, and wherein.

DETAILED DESCRIPTION OF THE INVENTION

Figure 1:
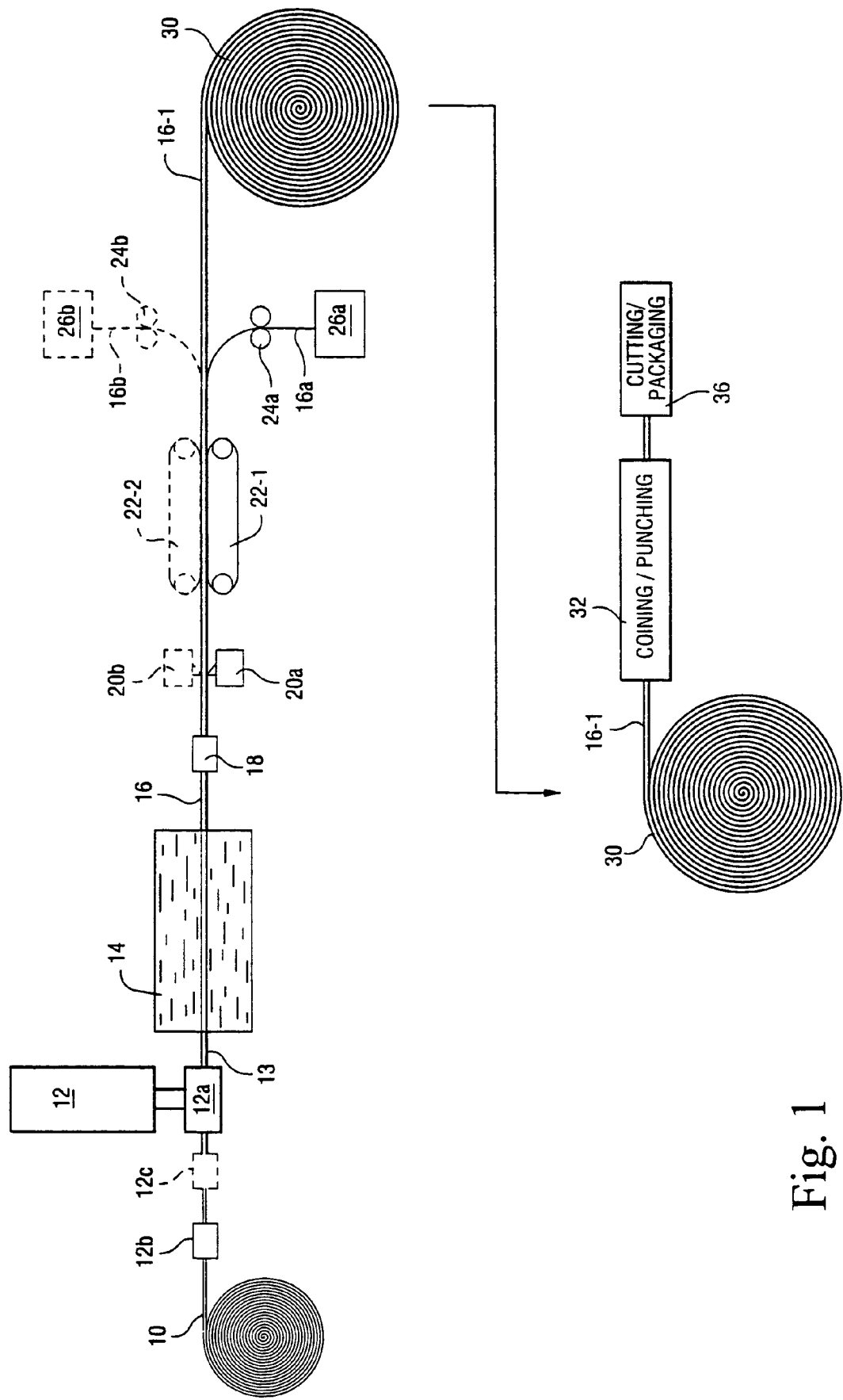
FIG. 1 is a schematic view showing a possible manufacturing sequence in accordance with the present invention.

Accompanying FIG. 1 depicts one possible manufacturing sequence for making the upholstery tack strip of the present invention. In this regard, a roll of metal strip or ribbon stock 10 may be fed to and through the cross-head die 12a associated with screw extruder 12. Prior to being fed through the cross-head die 12a, however, the ribbon 10 is preferably pulled through a knurling tool 12b which may include, for example, a pair of opposed knurled rollers acting on at least one, and preferably both, of the lateral edges of the metal ribbon 10 so as to knurl the same as shown by reference numeral iQa in FIGS. 2–3 below. In this manner, the knurled edges 10a a present a series of transverse ridges extending along the lengthwise extent of the lateral edges of the metal ribbon 10 so as to establish a roughened surface to the thermoplastic sleeve applied via the cross-head die 12a. In such a manner, the transverse ridges of the knurled edges 10a assist in anchoring the ribbon 10 thereto. The ribbon 10 may optionally alternatively or additionally be pulled through an adhesive applicator 12c which serves to apply an adhesive material onto the ribbon 10 and thereby assist in anchoring the thermoplastic sleeve thereto which will be applied via the cross-head die 12a.

As is well known, thermoplastic pellets may be fed into the hopper (not shown) of the screw extruder 12. The extruder 12 thus forms a molten stream of the thermoplastic material which is fed into the cross-head die 12a and applies a coating over the entire surfaces of metal ribbon 10. The coated ribbon (now designated by numeral 13 in FIG. 1) then enters a water quench bath 14. Upon cooling, therefore, the thermoplastic material is thereby coated onto the metal ribbon stock 12 so as to form a composite strip preform 16. Specifically, the preform 16 includes a core of the metal ribbon stock 10 which is embedded within, and thus coated entirely by, a sleeve formed of solidified thermoplastic material (i.e., the solidified residue of the thermoplastic material applied in its molten state by the cross-head die 12a).

Virtually any thermoplastic material may be employed in accordance with the present invention. Preferred thermoplastic materials include polyolefins (e.g., polyethylene and polypropylene), nylons, polyesters, polyvinyl chlorides and the like.

The composite strip preform 16 passes through an air dryer 18 which serves to remove water from the surface of the perform 16 prior to being directed to a cutter 20a. The perform is pulled from the roll of stock through the cross-head die 12a, quench bath 14 air dryer 18 and cutter 20a via an opposed set of pull rolls 22-1, 22-2. The cutter 20a serves to cut a substantially centrally located longitudinally oriented strip section 16a of the thermoplastic coating, which strip 16a is then removed from the upper and lower surfaces, respectively, of the metal stock 10 via roller pairs 24a. The removed thermoplastic strip 16a is then collected in waste bin 26a for recycling to the extruder 12 where it can be re-melted and combined with virgin thermoplastic material so as to coat the stock 10 in the cross-head die as was explained previously.

Figure 2:
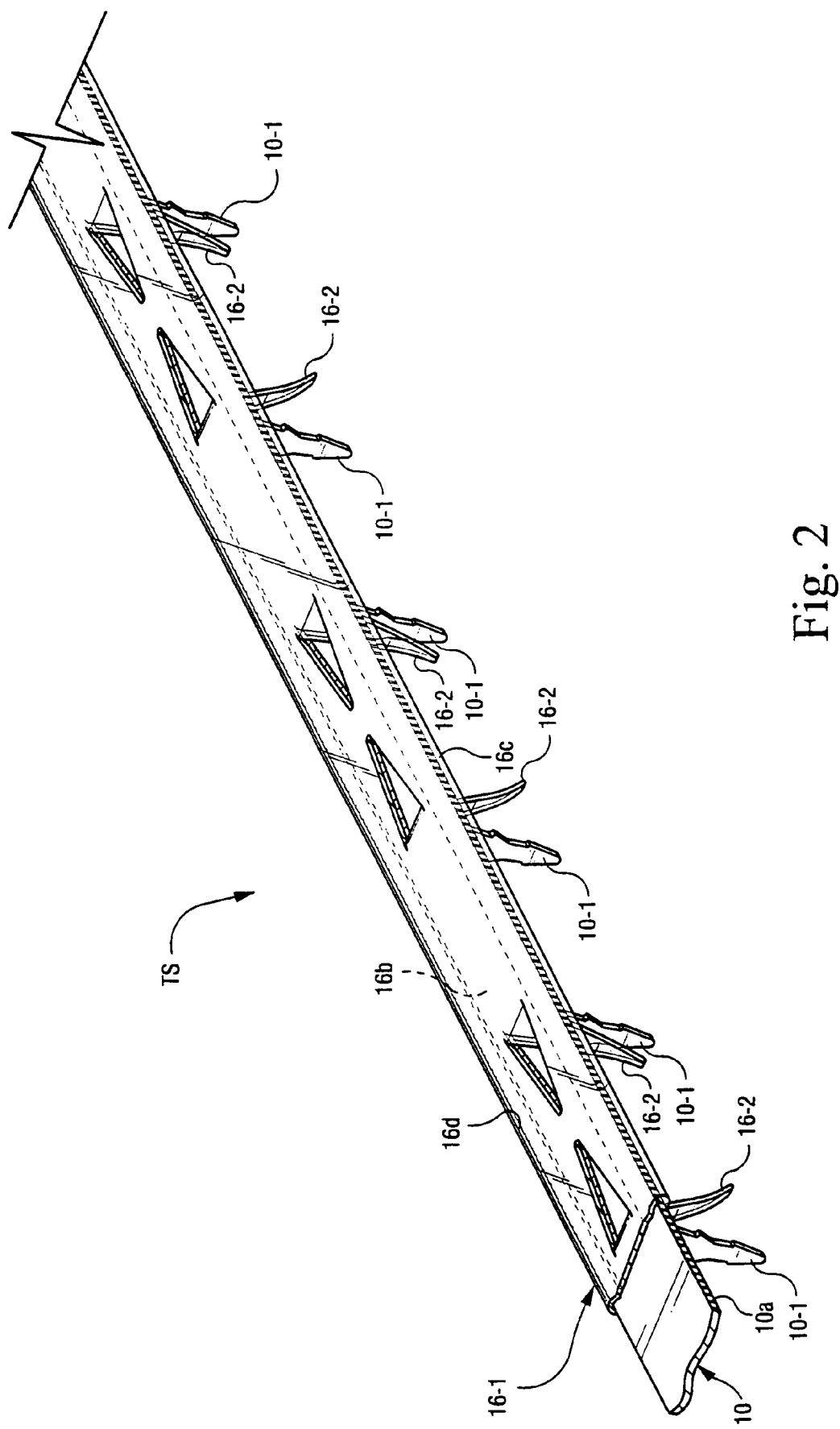
FIG. 2 is a top perspective view showing a representative length of an upholstery tack strip in accordance with the present invention.
Figure 3:
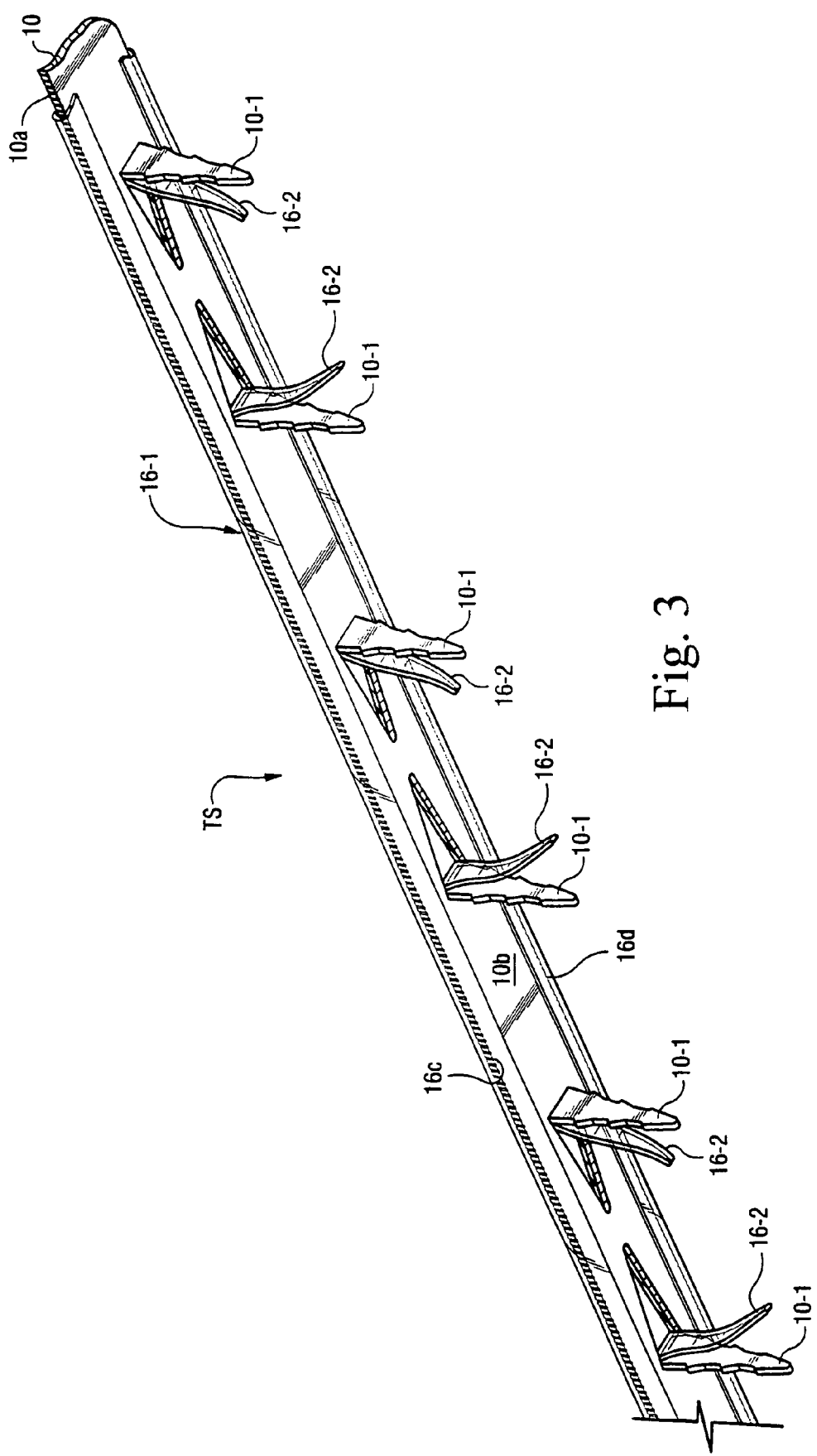
FIG. 3 is a bottom perspective view showing a representative length of an upholstery tack strip in accordance with the present invention.

Optionally, a cutter 20b, rollers 24b and waste bin 26b may be provided so as to remove a strip 16b from the opposite surface of the composite strip 16. If such a strip 16b is removed, then a pair of longitudinally extending exposed surface regions of the metal ribbon 10 will result. That is, with removal of both strips 16a, 16b, only the side edge regions of the stock 10 will be covered with the thermoplastic material forming generally U-shaped edge protectors. Most preferably, however, as shown in FIGS. 2 and 3, only the bottom strip 16a is removed thereby exposing a lengthwise extending section 10b of the lower surface of the metal strip 10 (see FIG. 3).

The edge-coated perform (now designated by reference numeral 16-1 in FIG. 1) may subsequently be formed into a roll 30 and then used as a feed for a coining/punching operation 32 as shown in FIG. 1. Alternatively, the composite strip preform 16 may be fed continuously from the cross-head die 12a, through the cutter 20a and then to the coining/punching operation 32.

During the coining/punching operation 32, nail-forming punch dies are brought to bear directly against the upper and lower surfaces metal strip 10. Thus, as with conventional tack strips, therefore, the coining/punching operation 32 serves to punch out generally triangularly shaped nails 10-1 from the metal ribbon 10 and bend them at substantially right angles thereto as shown in accompanying FIGS. 2 and 3. The finished tack strip TS in accordance with the present invention may then be cut into desired lengths (e.g., from about 3 inches in length up to about 48 inches in length), packaged and shipped in operation 36 as shown in FIG. 1.

As can be appreciated, removal of the strip 16a will form a pair of opposed edge protectors 16c, 16d as an integral extruded member which covers the lateral edges of the metal ribbon stock 10. That is, the removal of the strip 16a to expose the lower surface of ribbon 10 will provide the generally U-shaped edge protectors 16c, 16d which are joined integrally one to another along the upper surface of the ribbon 10. As such, the sleeve and the edge protectors 16c, 16d do not need to be installed during a separate operation. As noted previously, the knurled edges 10a of the ribbon 10 present a roughed surface to the edge protectors 16c, 16d thereby anchoring the ribbon 10 thereto. However, if desired, an adhesive may be alternatively or additionally be applied to the edges 10a of the ribbon stock 10 prior to being drawn through the cross-head die 12a so that the resulting edge protectors 16c, 16d remain physically in place during handling. Also, in the embodiment depicted in FIGS. 2 and 3 wherein only strip 16a is removed, there will also exist generally triangular sleeve remnants 16-2 integrally attached at their bases to the sleeve. Such remnants 16-2 will thus extend downwardly through the hole remaining in the ribbon 10 by virtue of the nails 10-1 being formed in the coining/punching operation 32.

Thus, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of making an upholstery tack strip comprising the steps of:
   (i) extruding a thermoplastic sleeve over a length of metal ribbon stock having at least one roughed lateral edge;
   (ii) removing a lengthwise section of the thermoplastic sleeve to expose a corresponding lengthwise surface region of the metal ribbon stock; and
   (iii) forming nail sections from said exposed corresponding surface regions of the metal ribbon stock which protrude outwardly therefrom.

2. The method of claim 1, further comprising prior to step (i), the step of (i-1) passing the metal ribbon stock through a surface-roughening tool so as to roughen a surface thereof.

3. The method of claim 2, wherein step of (i-1) includes passing the metal ribbon stock through a surface-roughening tool so as to knurl the at least one lateral edge of the metal ribbon stock.

4. The method of claim 3, wherein each opposed lateral edge of the metal ribbon stock is knurled by the practice of step of (i-1).

5. The method of claim 4, comprising, prior to step (i), the step of applying an adhesive to the metal ribbon stock.

6. The method of claim 1, wherein step (i) is practiced by passing the metal ribbon stock through a cross-head die, and coating molten thermoplastic material onto the metal ribbon stock in the die.

7. The method of claim 6, further comprising, prior to step (i), the step of (i-1) roughening the at least one lateral edge of the metal ribbon stock.

8. The method of claim 7, wherein step (i-1) comprises roughening both lateral edges of the metal ribbon stock.

9. The method of claim 1, wherein step (ii) is practiced so as to remove a strip of thermoplastic material so as to expose a lower surface of said metal ribbon stock.

10. The method of claim 9, wherein step (iii) is practiced so as to form nail sections which extend outwardly from said lower surface of said metal ribbon stock.

11. The method of claim 10, wherein step (i) is practiced by passing the metal ribbon stock through a cross-head die, and coating molten thermoplastic material onto the metal ribbon stock in the die.

12. The method of claim 1, wherein step (ii) is practiced so as to remove a pair of lengthwise sections of the thermoplastic sleeve so as to expose upper and lower surface regions of the metal ribbon stock.

13. The method of claim 1, wherein step (iii) is practiced so as to form generally triangularly shaped nail sections which extend outwardly from said bottom surface region of the metal ribbon stock.

14. The method of claim 1, wherein said sleeve is formed of a thermoplastic material selected from the group consisting of polyolefins, nylons, polyesters, and polyvinyl chlorides.

15. A method of making an upholstery tack strip comprising the steps of:
 (i) providing a length of metal ribbon stock;
 (ii) extruding a molten thermoplastic material over a length of metal ribbon stock so as to form a composite strip preform comprised of the metal ribbon stock which is embedded within and coated entirely by a sleeve of the thermoplastic material; and thereafter
 (iii) punching nail sections from the composite strip preform.

16. The method of claim 15, wherein prior to step (i), there is practiced the step (i-1) of passing the metal ribbon stock through a knurling tool so as to form the series of transverse ridges along a lengthwise extent of the at least one lateral edge thereof.

17. The method of claim 16, wherein each opposed lateral edge of the metal ribbon stock is knurled by the practice of step of (i-1) so as to have the series of transverse ridges along a lengthwise extents thereof.

18. The method of claim 15, wherein step (i) comprises providing a length of metal ribbon stock having a series of transverse ridges along a lengthwise extent of at least one lateral edge thereof.

* * * * *